(12) United States Patent
Shigeta et al.

(10) Patent No.: US 10,837,799 B2
(45) Date of Patent: Nov. 17, 2020

(54) DRIVING APPARATUS AND DRIVING CONTROL METHOD

(71) Applicant: Sony Mobile Communications Inc., Tokyo (JP)

(72) Inventors: Yu Shigeta, Tokyo (JP); Masahiro Shimase, Tokyo (JP); Kazuaki Hirakawa, Tokyo (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/381,039

(22) Filed: Apr. 11, 2019

(65) Prior Publication Data

US 2019/0331506 A1    Oct. 31, 2019

(30) Foreign Application Priority Data

Apr. 27, 2018    (JP) ................. 2018-086950

(51) Int. Cl.
*G01D 5/12*    (2006.01)
*G01B 5/24*    (2006.01)
*G01D 5/20*    (2006.01)

(52) U.S. Cl.
CPC ............. *G01D 5/125* (2013.01); *G01B 5/24* (2013.01); *G01D 5/2006* (2013.01)

(58) Field of Classification Search
CPC ...... H02P 1/00; H02P 1/04; H02P 1/24; H02P 1/26; H02P 1/42; H02P 1/46; H02P 7/00; H02P 8/00; H02P 21/00; H02P 23/00; H02P 25/00; H02P 27/00; H02P 27/04; H02P 27/06; H02P 3/00; H02P 3/12; H02P 3/18; G01J 1/0266; G01J 1/1626; G05B 11/28; H02K 29/08
USPC .. 318/400.4, 400.38, 400.01, 700, 701, 721, 318/727, 779, 799, 800, 801, 430, 432, 318/437, 400.16, 400.37, 400.39
See application file for complete search history.

(56) References Cited

U.S. PATENT DOCUMENTS

| | | | | |
|---|---|---|---|---|
| 3,264,538 A | * | 8/1966 | Brailsford | H02K 33/14 318/400.37 |
| 3,806,785 A | * | 4/1974 | DeValroger | H02K 29/12 318/400.2 |
| 5,801,478 A | * | 9/1998 | Nashiki | H02K 1/246 310/162 |
| 6,780,153 B2 | * | 8/2004 | Angelsen | A61B 8/00 600/444 |
| 6,931,957 B2 | * | 8/2005 | Saito | F16H 59/70 74/335 |
| 7,250,701 B2 | * | 7/2007 | Yoshiyama | H02K 29/08 310/166 |

(Continued)

FOREIGN PATENT DOCUMENTS

JP    2006-337206 A    12/2006

*Primary Examiner* — Antony M Paul
(74) *Attorney, Agent, or Firm* — Xsensus LLP

(57) ABSTRACT

There is provided a driving apparatus including: a rotation unit configured to be rotated about a center shaft by driving of a motor; a rotation angle acquisition unit configured to acquire information of a rotation angle of the rotation unit, as information proportional to the rotation angle; and a control unit configured to control the driving of the motor on the basis of the information of the rotation angle acquired by the rotation angle acquisition unit.

9 Claims, 22 Drawing Sheets

(56) References Cited

U.S. PATENT DOCUMENTS

| | | | | |
|---|---|---|---|---|
| 8,115,479 B2* | 2/2012 | Aimuta | ............... | G01D 5/2451 |
| | | | | 324/207.25 |
| 10,376,276 B2* | 8/2019 | Overmyer | ............... | A61B 17/29 |
| 10,442,460 B2* | 10/2019 | Farrelly | ............... | B62D 5/0484 |
| 2012/0013515 A1* | 1/2012 | Berejik | ................... | H01Q 3/08 |
| | | | | 343/766 |
| 2018/0208239 A1* | 7/2018 | Farrelly | ............... | B62D 5/0484 |

* cited by examiner

DRIVING APPARATUS AND DRIVING CONTROL METHOD

CROSS REFERENCE TO RELATED APPLICATIONS

This application claims the benefit of Japanese Priority Patent Application JP 2018-086950 filed Apr. 27, 2018, the entire contents of which are incorporated herein by reference.

BACKGROUND

The present disclosure relates to a driving apparatus and a driving control method.

As a method for causing a set object to be rotationally driven by a desired angle, there is a method in which gears are turned by a motor and an object is caused to be rotationally driven by the rotation of the gears. If wireless power supply to the object is employed, examples of the method for causing the object to be rotationally driven by a desired angle include a method in which the rotation angle is calculated by providing a rotation sensor to any of gears to be rotated by a motor and using a gear ratio and a method in which the rotation angle is calculated by calibrating the position of an origin. Examples of literatures in which a rotation angle sensor is disclosed include JP 2006-337206A.

SUMMARY

However, control for rotational driving is complicated because multidimensional functional calculus is necessary for the calculation of the rotation angle from a gear ratio and further it is necessary to calibrate the position of an origin.

Thus, an embodiment of the present disclosure proposes a new and improved driving apparatus and a new and improved driving control method that can perform the control of the rotational driving of a set object by simple control.

According to an embodiment of the present disclosure, there is provided a driving apparatus including: a rotation unit configured to be rotated about a center shaft by driving of a motor; a rotation angle acquisition unit configured to acquire information of a rotation angle of the rotation unit, as information proportional to the rotation angle; and a control unit configured to control the driving of the motor on the basis of the information of the rotation angle acquired by the rotation angle acquisition unit.

Moreover, according to an embodiment of the present disclosure, there is provided a driving control method including: acquiring information of a rotation angle of a rotation unit configured to be rotated about a center shaft by driving of a motor, as information proportional to the rotation angle; and controlling the driving of the motor on the basis of the acquired information of the rotation angle.

As described above, according to an embodiment of the present disclosure, a new and improved driving apparatus and a new and improved driving control method that can perform the control of the rotational driving of a set object by simple control are provided.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
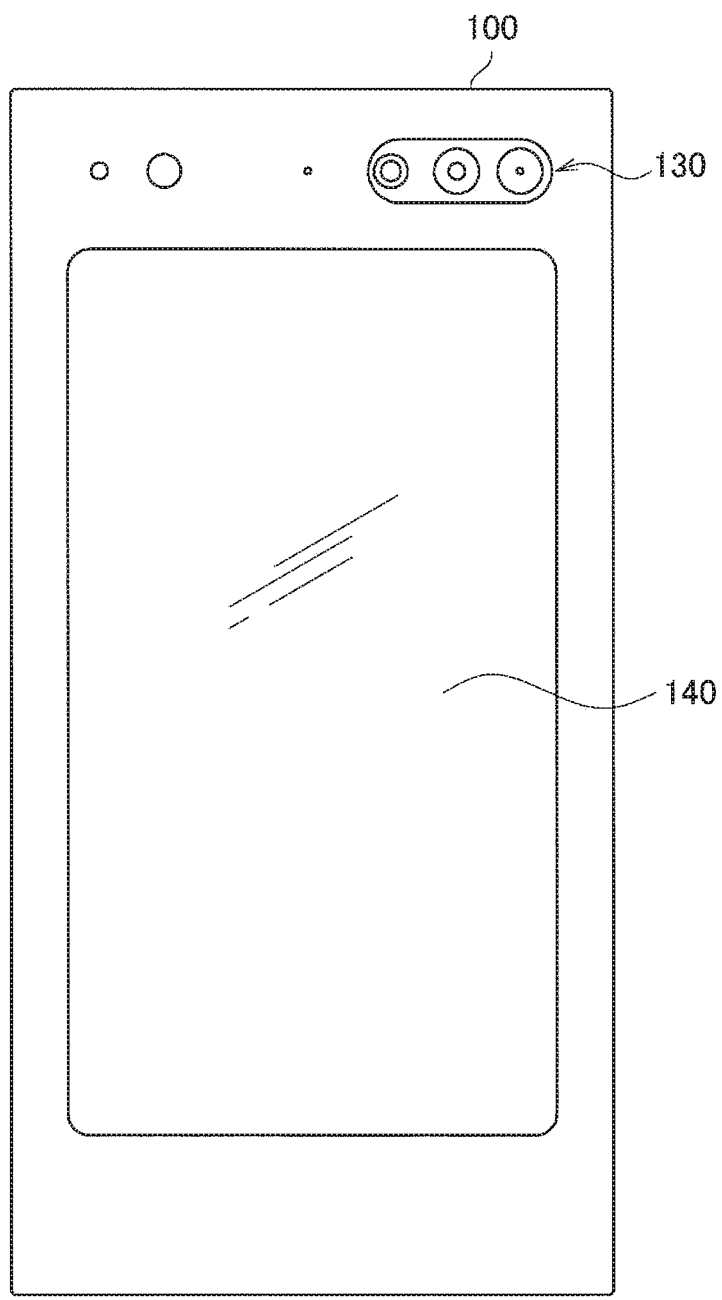
FIG. 1 is an explanatory diagram showing an external appearance example of a display apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Embodiments of present disclosure
1.1. External appearance example of display apparatus
1.2. Configuration examples of cradle
2. Conclusions <1. Embodiments of Present Disclosure>

[1.1. External Appearance Example of Display Apparatus]

First, an external appearance example of a display apparatus according to an embodiment of the present disclosure is described. FIG. 1 to FIG. 6 are explanatory diagrams showing an external appearance example of a display apparatus according to an embodiment of the present disclosure.

Figure 2:
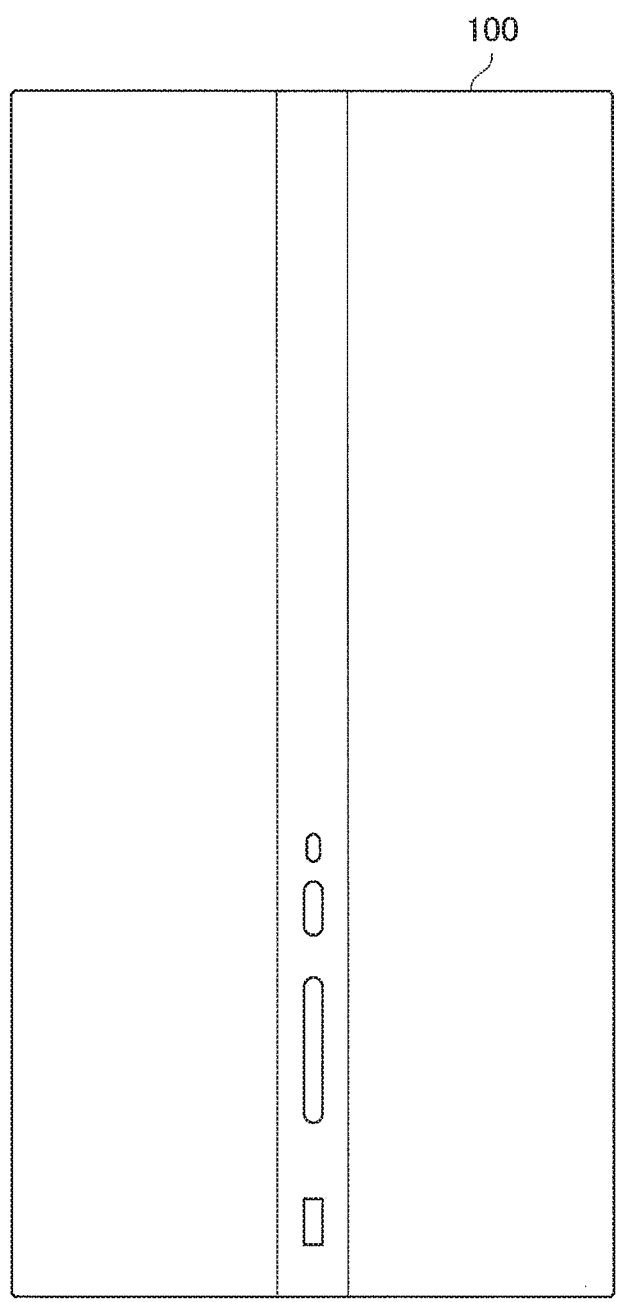
FIG. 2 is an explanatory diagram showing the external appearance example of the display apparatus according to the embodiment.
Figure 3:
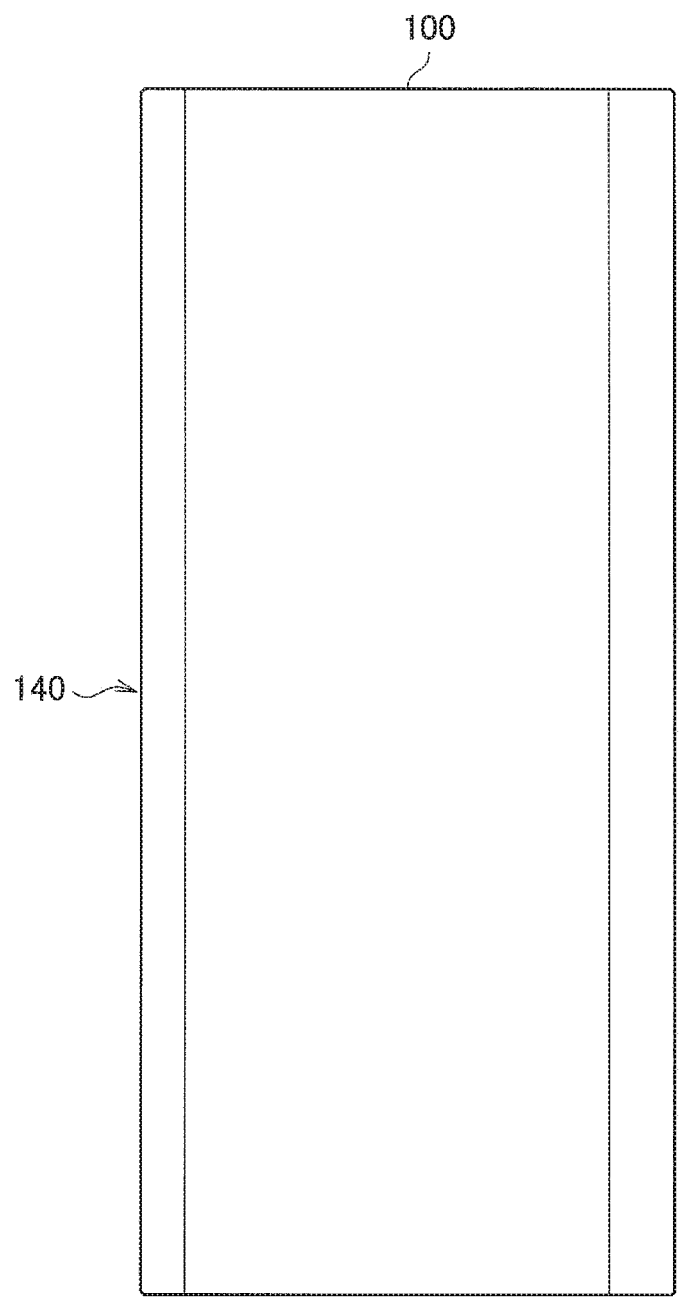
FIG. 3 is an explanatory diagram showing the external appearance example of the display apparatus according to the embodiment.
Figure 4:
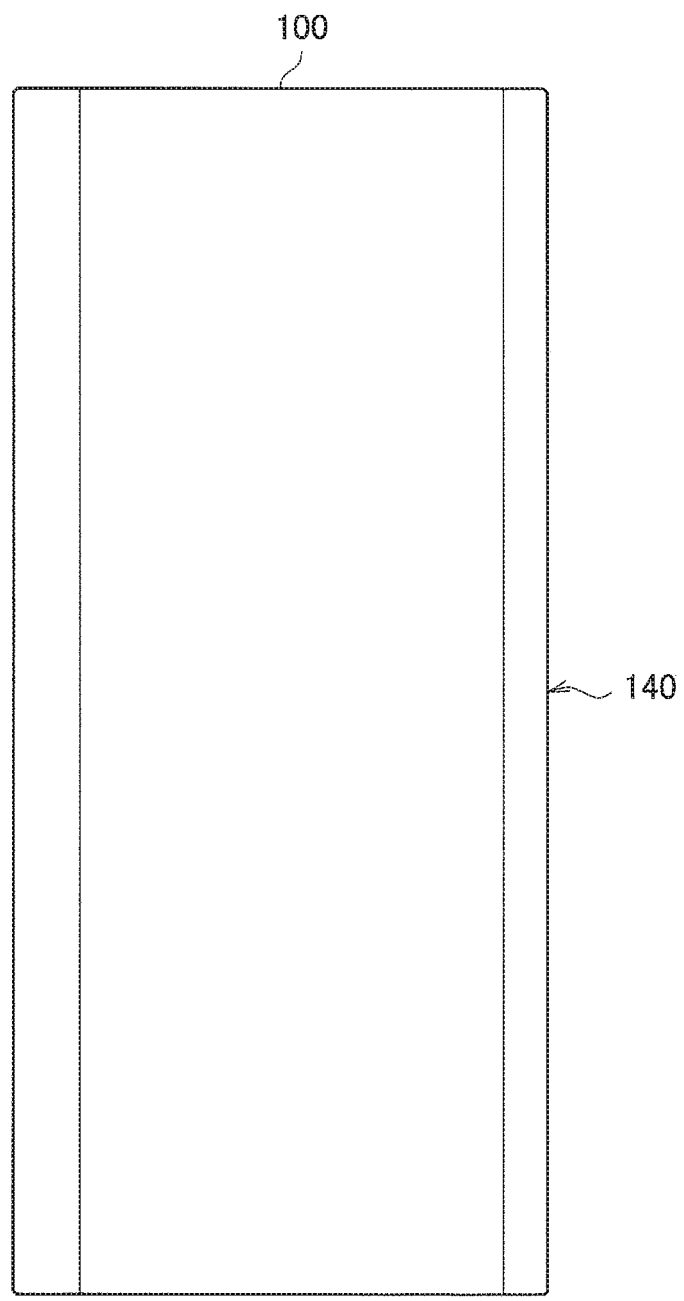
FIG. 4 is an explanatory diagram showing the external appearance example of the display apparatus according to the embodiment.
Figure 5:
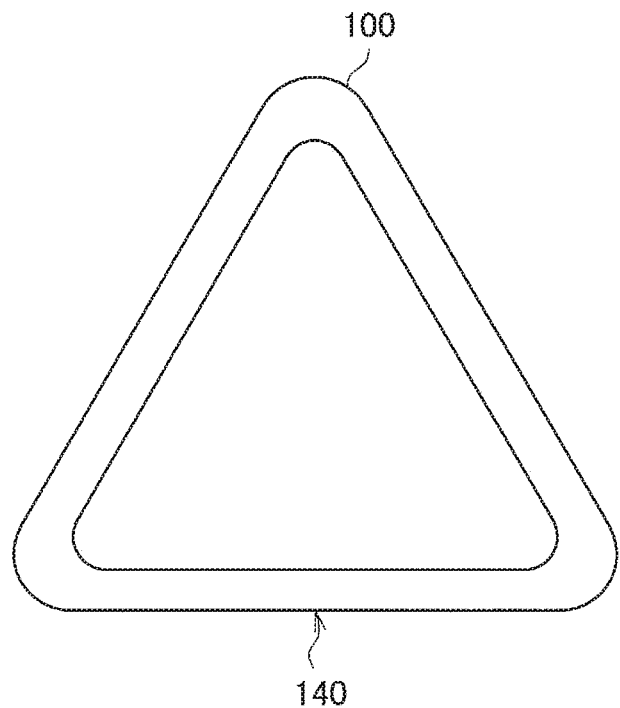
FIG. 5 is an explanatory diagram showing the external appearance example of the display apparatus according to the embodiment.
Figure 6:
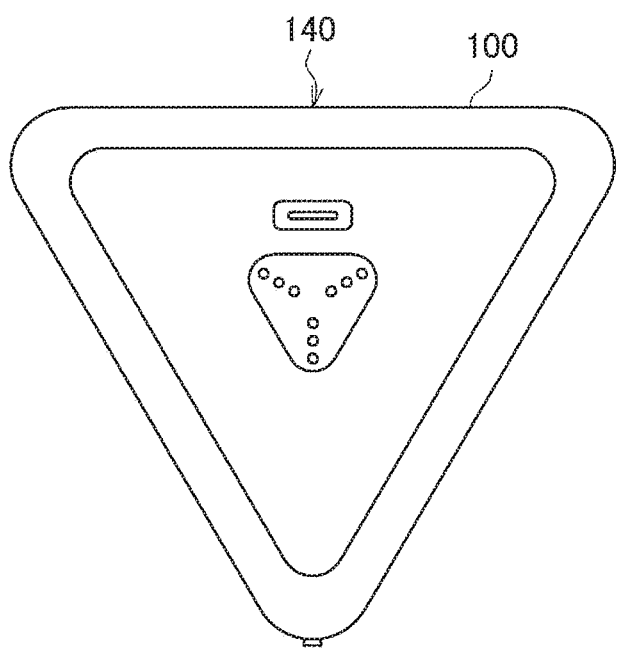
FIG. 6 is an explanatory diagram showing the external appearance example of the display apparatus according to the embodiment.

As shown in FIG. 1 to FIG. 6, a display apparatus 100 according to an embodiment of the present disclosure is an apparatus having a columnar cabinet in which the bottom surface is substantially a regular triangle. FIG. 1 is a front view of the display apparatus 100 according to an embodiment of the present disclosure. FIG. 2 is a back view of the display apparatus 100 according to an embodiment of the present disclosure. FIG. 3 is a right side view of the display apparatus 100 according to an embodiment of the present disclosure. FIG. 4 is a left side view of the display apparatus 100 according to an embodiment of the present disclosure. FIG. 5 is a plan view of the display apparatus 100 according to an embodiment of the present disclosure. FIG. 6 is a bottom view of the display apparatus 100 according to an embodiment of the present disclosure.

The display apparatus 100 according to an embodiment of the present disclosure includes a display unit 140 on the front surface. The display unit 140 includes, for example, a thin display device such as a liquid crystal display, and is a device that can display a planar image and a stereo image based on a naked eye system.

Further, the display apparatus 100 according to an embodiment of the present disclosure includes a sensor unit 130 on the front surface. The sensor unit 130 is provided in order to detect the state of a user who is viewing content displayed by the display unit 140. In the present embodiment, the sensor unit 130 includes an image sensor for detecting the state of the user from a captured image and a time-of-flight (ToF) sensor for detecting the distance from the sensor unit 130 to the user. The display apparatus 100 according to an embodiment of the present disclosure can choose whether to display a planar image or a stereo image as an image displayed on the display unit 140, on the basis of the result of sensing by the sensor unit 130.

Figure 7:
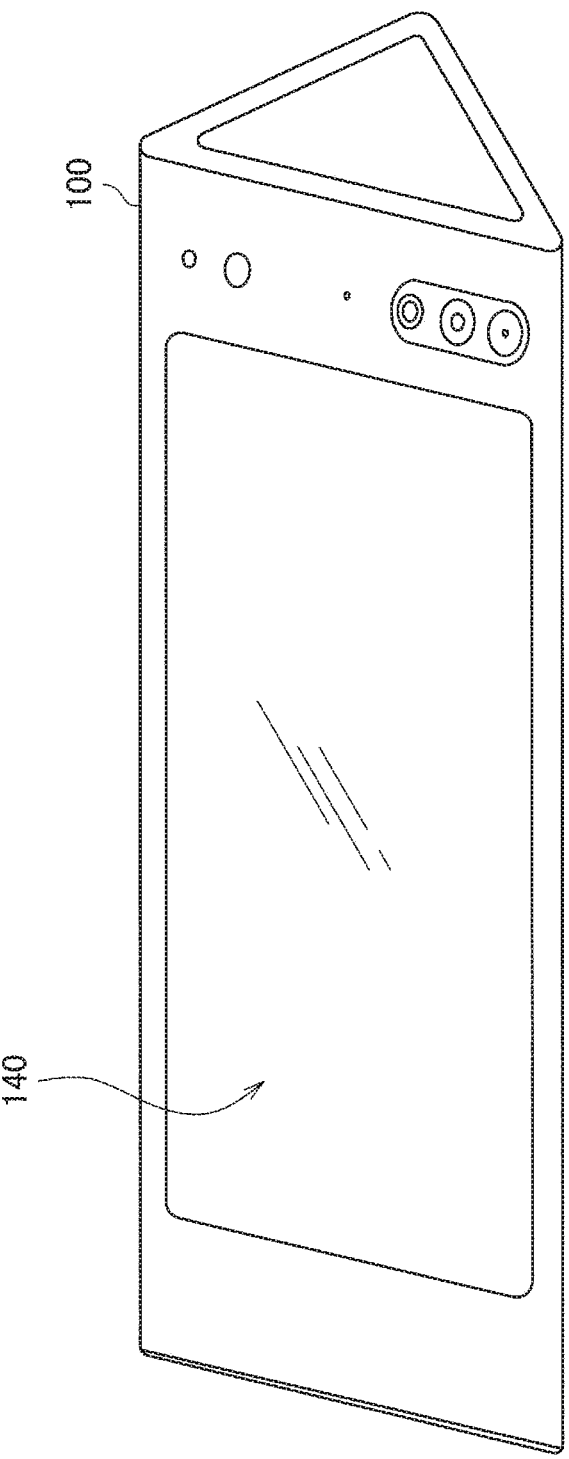
FIG. 7 is an explanatory diagram showing a situation where the display apparatus according to the embodiment is put in a transverse placement.

By having a columnar cabinet in which the bottom surface is substantially a regular triangle, the display apparatus 100 according to an embodiment of the present disclosure by itself allows the viewing and listening of content in a transverse placement by the user to be performed easily. FIG. 7 is an explanatory diagram showing a situation where the display apparatus 100 according to an embodiment of the present disclosure is put in a transverse placement.

Figure 8:
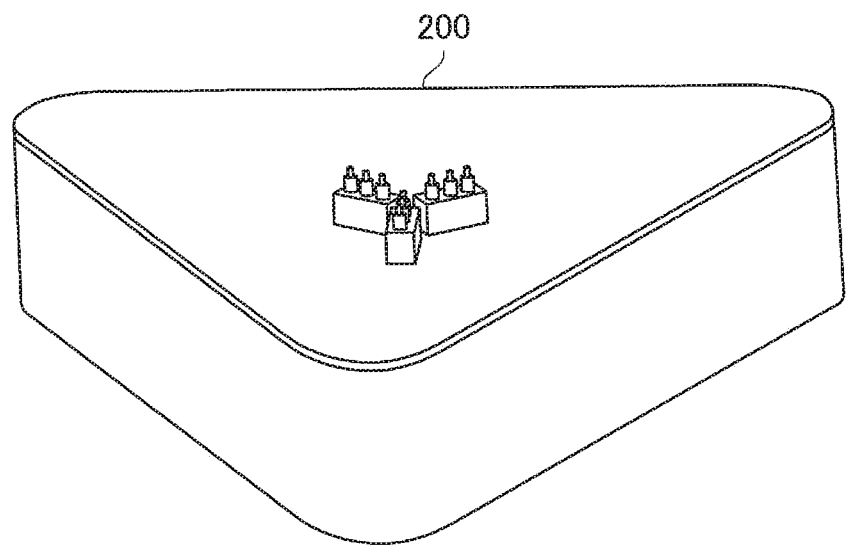
FIG. 8 is an explanatory diagram showing an external appearance example of a cradle according to the embodiment.

A cradle can be connected to the bottom surface of the display apparatus 100 according to an embodiment of the present disclosure. FIG. 8 is an explanatory diagram showing an external appearance example of a cradle 200 according to an embodiment of the present disclosure. The cradle 200 has a columnar cabinet having a bottom surface of substantially a regular triangle, similarly to the bottom surface of the display apparatus 100.

Figure 9:
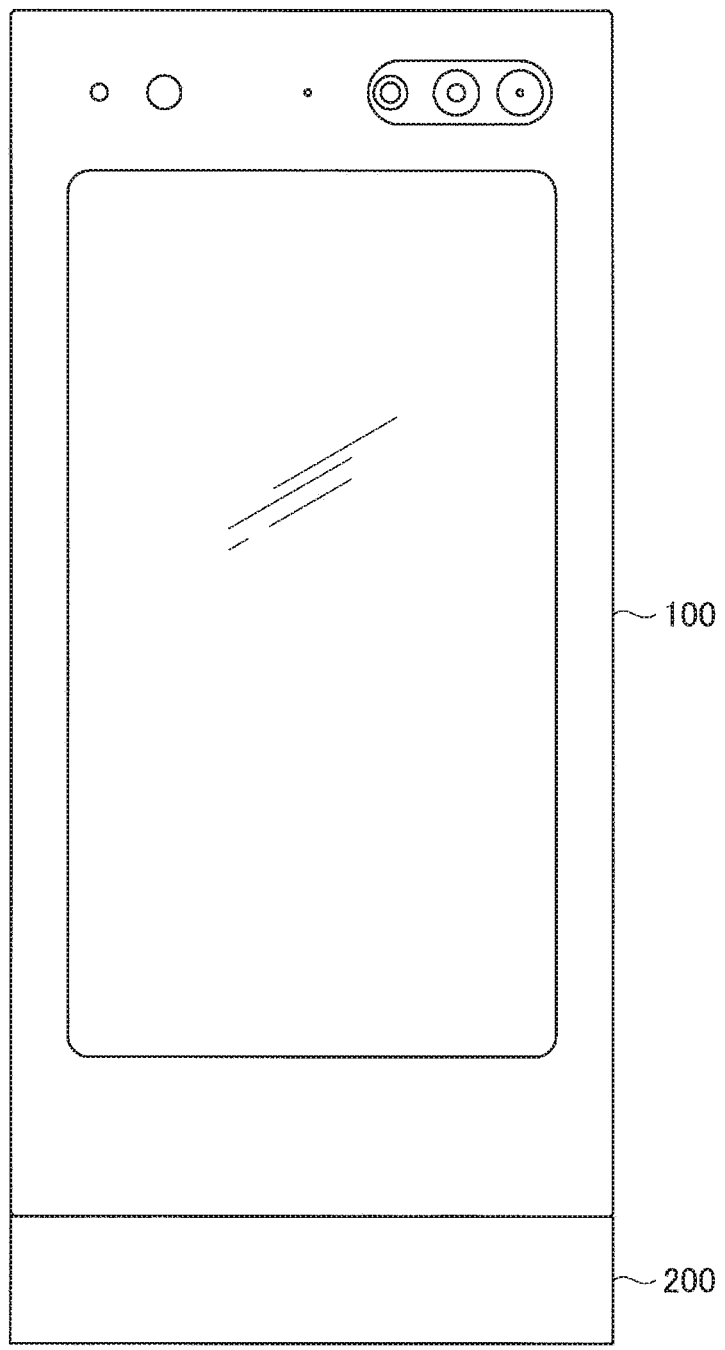
FIG. 9 is an explanatory diagram showing a state where the display apparatus according to the embodiment is set on the cradle.

FIG. 9 is an explanatory diagram showing a state where the display apparatus 100 is set on the cradle 200. The display apparatus 100 can be supplied with electric power from the cradle 200 by being set on the cradle 200 as shown in FIG. 9. Further, the cradle 200 can rotationally move the display apparatus 100 with the longitudinal direction of the display apparatus 100 as the axis. The rotational movement of the display apparatus 100 may be performed by a hand of the user, or may be performed by the display apparatus 100 causing the cradle 200 to be driven.

[1.2. Configuration Examples of Cradle]

Figure 10:
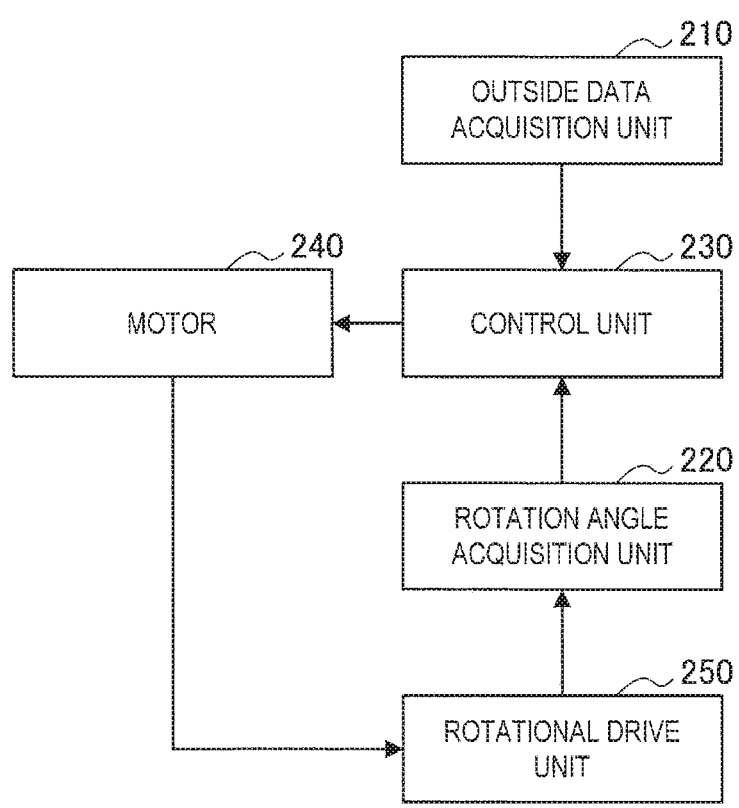
FIG. 10 is an explanatory diagram showing a functional configuration example of a cradle according to an embodiment of the present disclosure.

Next, a functional configuration example of the cradle 200 according to an embodiment of the present disclosure is described. FIG. 10 is an explanatory diagram showing a functional configuration example of the cradle 200 according to an embodiment of the present disclosure. Hereinbelow, a functional configuration example of the cradle 200 according to an embodiment of the present disclosure is described using FIG. 10.

As shown in FIG. 10, the cradle 200 according to an embodiment of the present disclosure includes an outside data acquisition unit 210, a rotation angle acquisition unit 220, a control unit 230, a motor 240, and a rotational drive unit 250.

The outside data acquisition unit 210 acquires data from an apparatus outside the cradle 200, such as the display apparatus 100. The data that the outside data acquisition unit 210 acquires from an outside apparatus may include various data. For example, the outside data acquisition unit 210 acquires data regarding direction from an outside apparatus. The data regarding direction are data acquired in the outside apparatus, and may be, for example, data with which the display apparatus 100 put on the cradle 200 instructs the cradle 200 to make clockwise rotation by a desired angle.

The rotation angle acquisition unit 220 acquires the rotation angle of the rotational drive unit 250. For example, the rotation angle acquisition unit 220 may be a sensor for acquiring the rotation angle of the rotational drive unit 250. The rotation angle of the rotational drive unit 250 is acquired by, for example, providing a magnet on the center shaft of the rotational drive unit 250 and using a magnetic rotation sensor to catch the magnetic flux emitted by the magnet. The rotation angle acquisition unit 220 sends the acquired rotation angle of the rotational drive unit 250 to the control unit 230.

The control unit 230 causes the motor 240 to be driven on the basis of data acquired by the outside data acquisition unit 210 or the rotation angle sent from the rotation angle acquisition unit 220. For example, if the data acquired by the outside data acquisition unit 210 are data based on an instruction to make rotation of 180 degrees, the control unit 230 causes the motor 240 to be driven on the basis of the rotation angle sent from the rotation angle acquisition unit 220 until the rotational drive unit 250 rotates 180 degrees.

The motor 240 is a motor that operates by the control of the control unit 230. The rotational drive unit 250 can be caused to be rotationally driven by the operation of the motor 240.

The rotational drive unit 250 is rotationally driven by the operation of the motor 240. The cradle 200 can rotationally move the set object (for example, the display apparatus 100) by the rotational drive unit 250 being rotationally driven by the operation of the motor 240.

Hereinabove, a functional configuration example of the cradle 200 according to an embodiment of the present disclosure is described using FIG. 10. Next, detailed configuration examples of the cradle 200, particularly of the rotational drive unit 250, are described.

Figure 11:
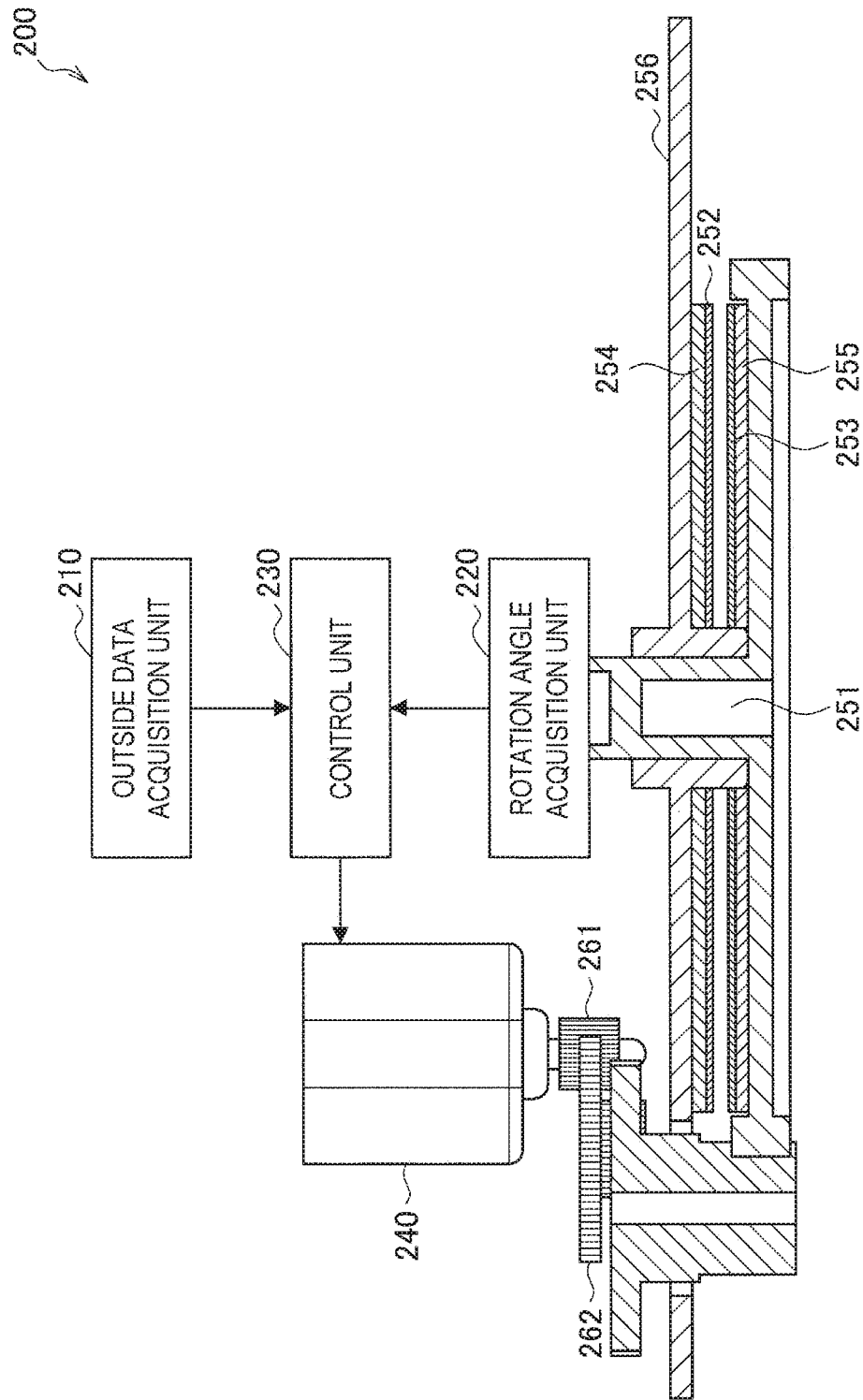
FIG. 11 is an explanatory diagram showing a detailed configuration example of a cradle according to an embodiment of the present disclosure.
Figure 12:
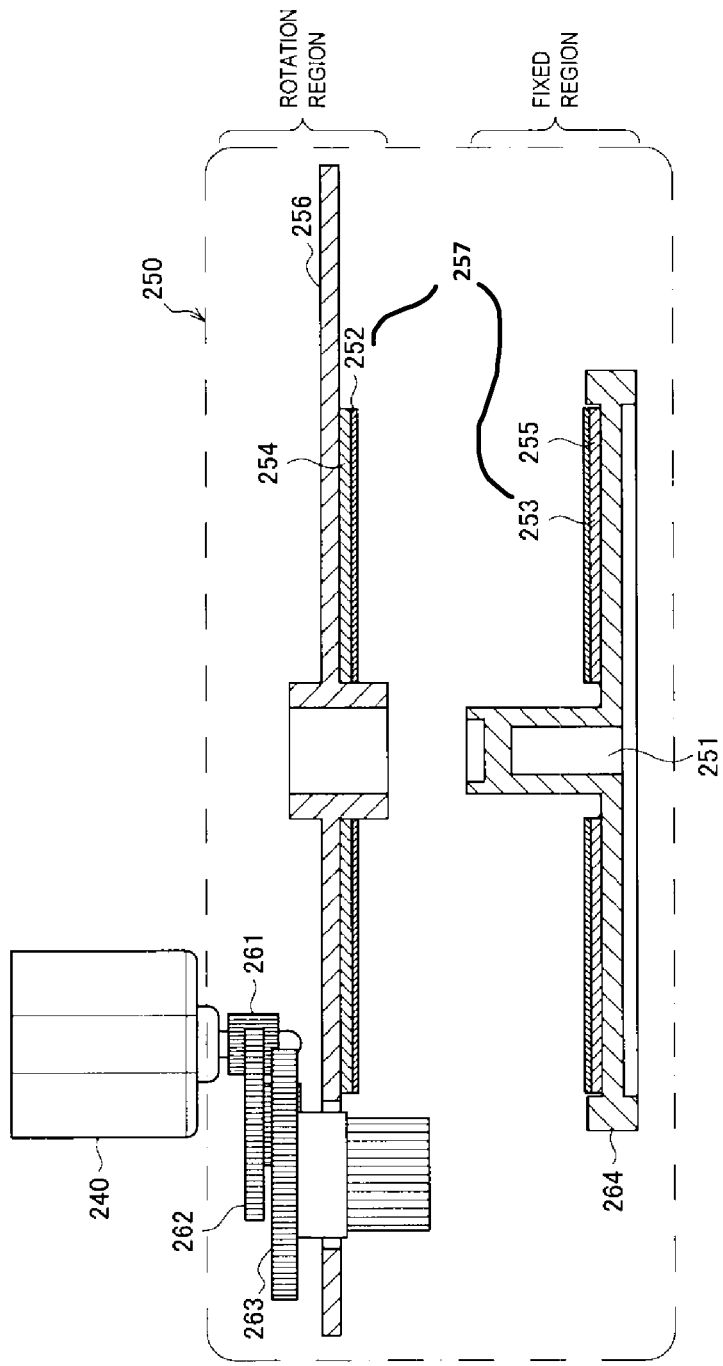
FIG. 12 is an explanatory diagram showing a detailed configuration example of a rotational drive unit.
Figure 13:
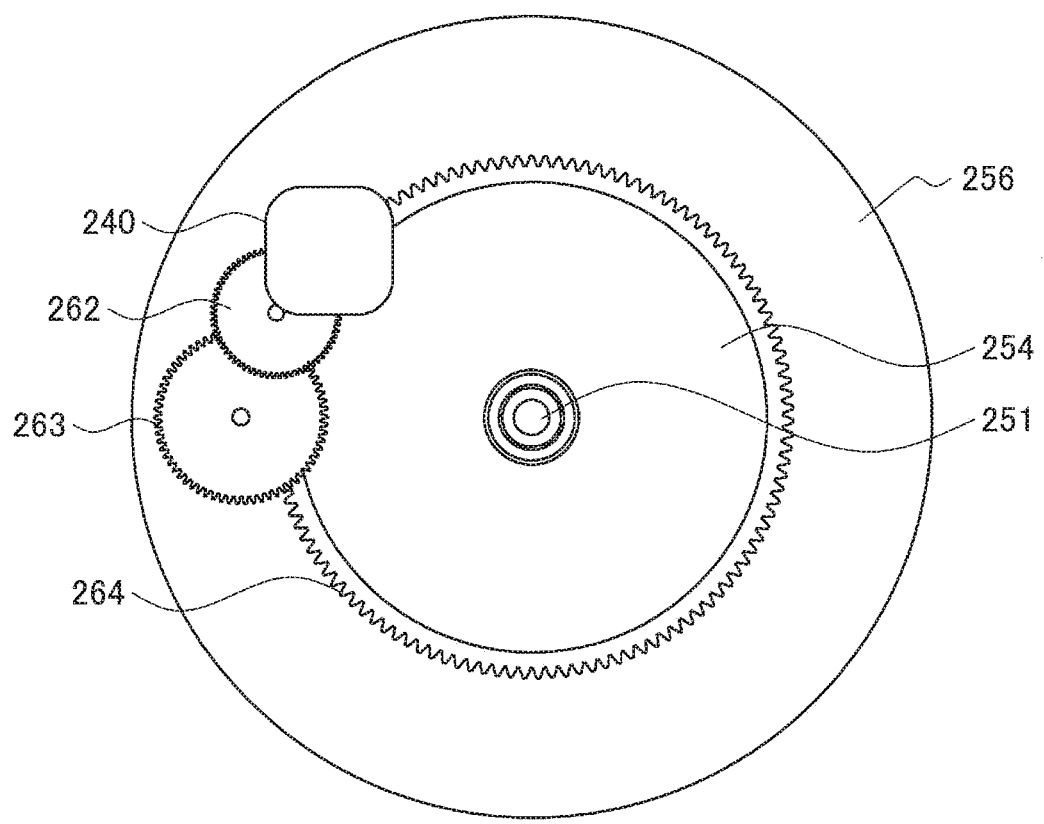
FIG. 13 is an explanatory diagram of a rotational drive unit as seen from a top side.

FIG. 11 is an explanatory diagram showing a detailed configuration example of the cradle 200 according to an embodiment of the present disclosure, and is particularly an explanatory diagram in which a configuration example of the rotational drive unit 250 is shown in detail from a lateral side. Further, FIG. 12 is an explanatory diagram showing a detailed configuration example of the rotational drive unit 250, and is an explanatory diagram showing the rotational drive unit 250 while separating a rotation region and a fixed region. Further, FIG. 13 is an explanatory diagram of the rotational drive unit 250 as seen from the upper side.

If the motor 240 operates, gear 261 rotates. In association with the rotation of gear 261, gear 262 engaged with gear 261 rotates. By the rotation of gear 262, gear 263 engaged with gear 262 on the lower side of gear 262 rotates. Gear 264 is fixed; therefore, by the rotation of gear 263, the rotation region of the rotational drive unit 250 rotationally moves about a center shaft 251, and the object (for example, the display apparatus 100) set on the cradle 200 rotationally moves.

Note that the number of teeth of each gear is not limited to the number shown in FIG. 11. Further, the number of gears is not limited to the number shown in FIG. 11, either.

As shown in FIG. 12, the rotational drive unit 250 has a fixed region and a rotation region. A disc unit 256 is provided in the rotation region of the rotational drive unit 250, and a receiving coil 252 and a magnetic shielding sheet 254 are provided on the lower surface of the disc unit 256. Further, a transmitting coil 253 and a magnetic shielding sheet 255 are provided in the fixed region of the rotational drive unit 250. The receiving coil 252 generates a current by electromagnetic induction based on a magnetic field generated by the transmitting coil 253. Further, the transmitting coil 253 generates a magnetic field by electromagnetic induction by passing a current.

In each of the receiving coil 252, the transmitting coil 253, and the magnetic shielding sheets 254 and 255, a hole is formed in a central portion so that the center shaft 251 can be passed through. Then, the transmitting coil 253 and the magnetic shielding sheet 255 rotate in accordance with the rotation of the center shaft 251. Non-contact power supply to the apparatus set on the cradle 200 is performed by a non-contact power supply unit 257 including the receiving coil 252 and the transmitting coil 253. The magnetic shielding sheets 254 and 255 prevent the release of the magnetic fields generated by the receiving coil 252 and the transmitting coil 253, respectively, to the outside.

In an embodiment of the present disclosure, the rotation angle acquisition unit 220 for acquiring the rotation angle of the rotation region of the rotational drive unit 250 is provided on the upper side of the center shaft 251 of the rotational drive unit 250. That is, the rotation angle acquired by the rotation angle acquisition unit 220 corresponds to the rotation angle of the rotation region of the rotational drive unit 250.

Thus, the cradle 200 according to an embodiment of the present disclosure can acquire the rotation of the rotational drive unit 250 and the rotation angle of the rotational drive unit 250 in a one-to-one manner. That is, the cradle 200 according to an embodiment of the present disclosure can easily perform the operational control of the motor 240 by the control unit 230.

The rotation angle acquisition unit 220 can acquire the absolute value of the rotation angle of the rotational drive unit 250. For example, an origin is set by aligning a detection switch such as a Hall sensor with a prescribed position in the front surface of the cabinet or the like. Then, the rotation angle acquisition unit 220 can acquire the absolute value of the rotation angle of the rotational drive unit 250 by using the value of the rotation sensor provided on the center shaft 251.

Figure 14:
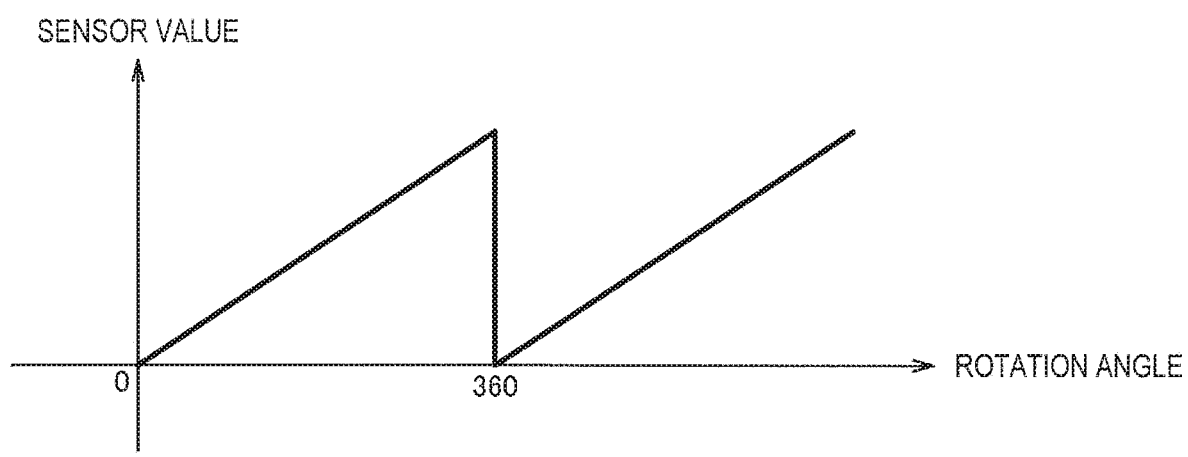
FIG. 14 is an explanatory diagram showing an example of a relationship between a rotation angle of a rotational drive unit and a sensor value of a rotation sensor acquired by a rotation angle acquisition unit.

FIG. 14 is an explanatory diagram showing an example of the relationship between the rotation angle of the rotational drive unit 250 and the sensor value of the rotation sensor acquired by the rotation angle acquisition unit 220. As shown in FIG. 14, if the rotation angle of the rotational drive unit 250 increases from 0 degrees, also the sensor value of the rotation sensor increases in accordance with the increase of the rotation angle. However, if the rotation angle of the rotational drive unit 250 becomes 360 degrees, the sensor value of the rotation sensor that has been increasing returns to 0. Thus, the sensor value can vary greatly in the vicinity of the period value of the rotation sensor, that is, in the vicinity of a rotation angle of the rotational drive unit 250 of 360 degrees. If the operation of the motor 240 is stopped in the vicinity of a rotation angle at which the sensor value varies greatly, there is a possibility that stable rotation control is not made.

Thus, in the present embodiment, the control unit 230 may perform control that stops the operation of the motor 240 while avoiding the vicinity of the period value of the rotation sensor. For example, the control unit 230 performs control that stops the operation of the motor 240 while avoiding a range of approximately 5 to 10 degrees around 360 degrees. The cradle 200 according to the present embodiment can perform stable rotation control by performing such control.

In the example described above, a hole is formed in the magnetic shielding sheet 255 corresponding to the transmitting coil 253 in order to allow the center shaft 251 to pass through. However, the power supply efficiency is reduced due to the fact that a hole is formed in the magnetic shielding sheet 255.

Figure 15:
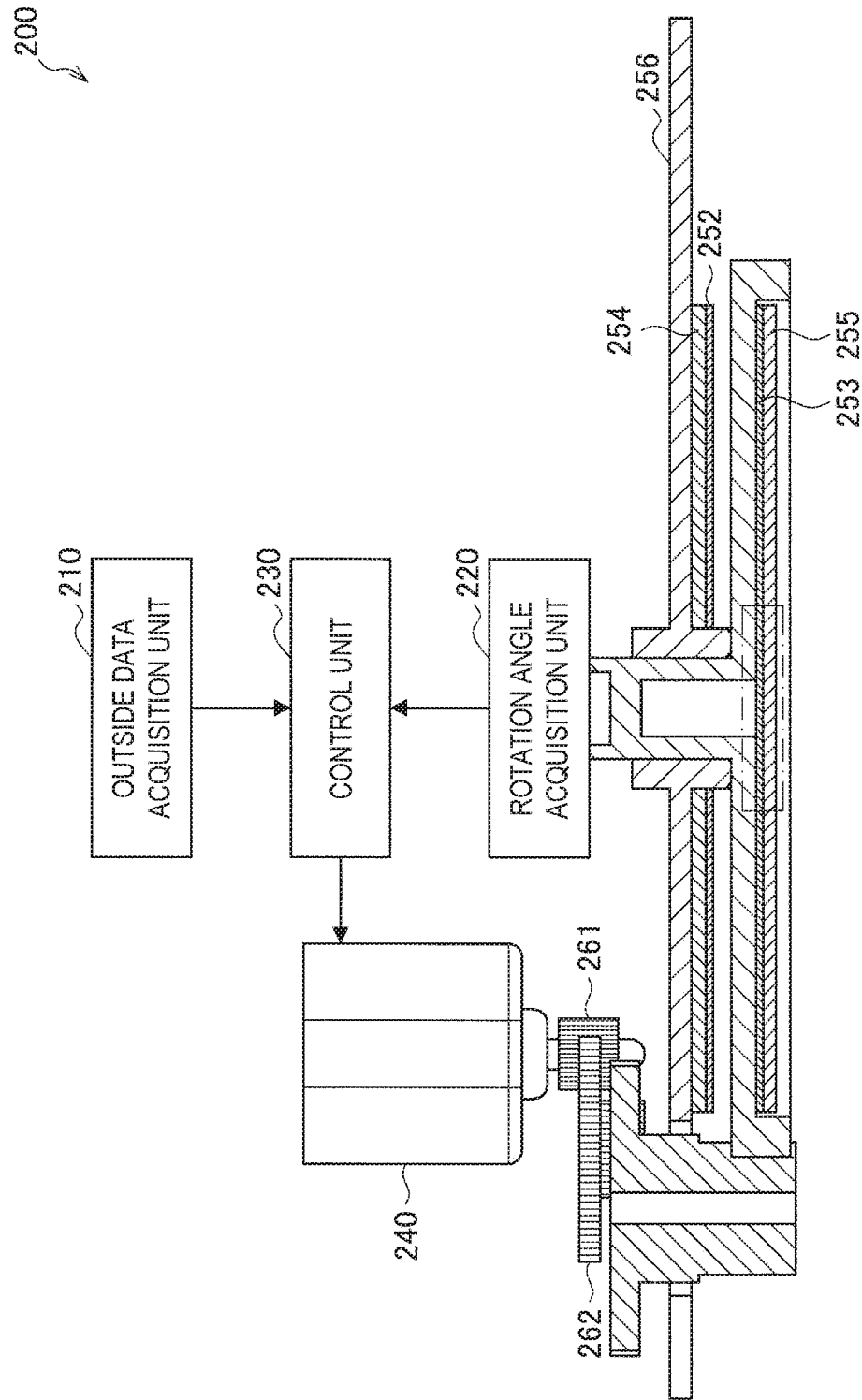
FIG. 15 is an explanatory diagram showing a detailed configuration example of a cradle.

Thus, the transmitting coil 253 may be installed on the back surface of gear 264. FIG. 15 is an explanatory diagram showing a detailed configuration example of the cradle 200, and is particularly an explanatory diagram in which a configuration example of the rotational drive unit 250 is shown in detail from a lateral side. FIG. 15 shows a configuration example of a cradle 200 in which the transmitting coil 253 and the magnetic shielding sheet 255 are provided further below gear 264. By installing the transmitting coil 253 on the back surface of gear 264 in this way, the magnetic shielding sheet 255 does not need a hole, and a reduction in the power supply efficiency based on the transmitting coil 253 can be prevented.

Hereinabove, configurations in which the rotation angle of the rotational drive unit 250 is acquired by providing a rotation sensor on the upper side of the center shaft 251 are described. Configurations for acquiring the rotation angle of the rotational drive unit 250 are not limited to related examples.

For example, the amount of electric power supplied by the receiving coil 252 and the transmitting coil 253 may not be constant but be changed in accordance with the rotation of the rotational drive unit 250. By changing the amount of electric power supplied by the receiving coil 252 and the transmitting coil 253 in accordance with the rotation of the rotational drive unit 250, the rotation angle can be determined by the amount of supplied electric power. That is, the amount of electric power supplied by the receiving coil 252 and the transmitting coil 253 can be made changeable in accordance with the rotation of the rotational drive unit 250, and the rotation angle can be acquired by a power supply mechanism by itself.

Figure 16:
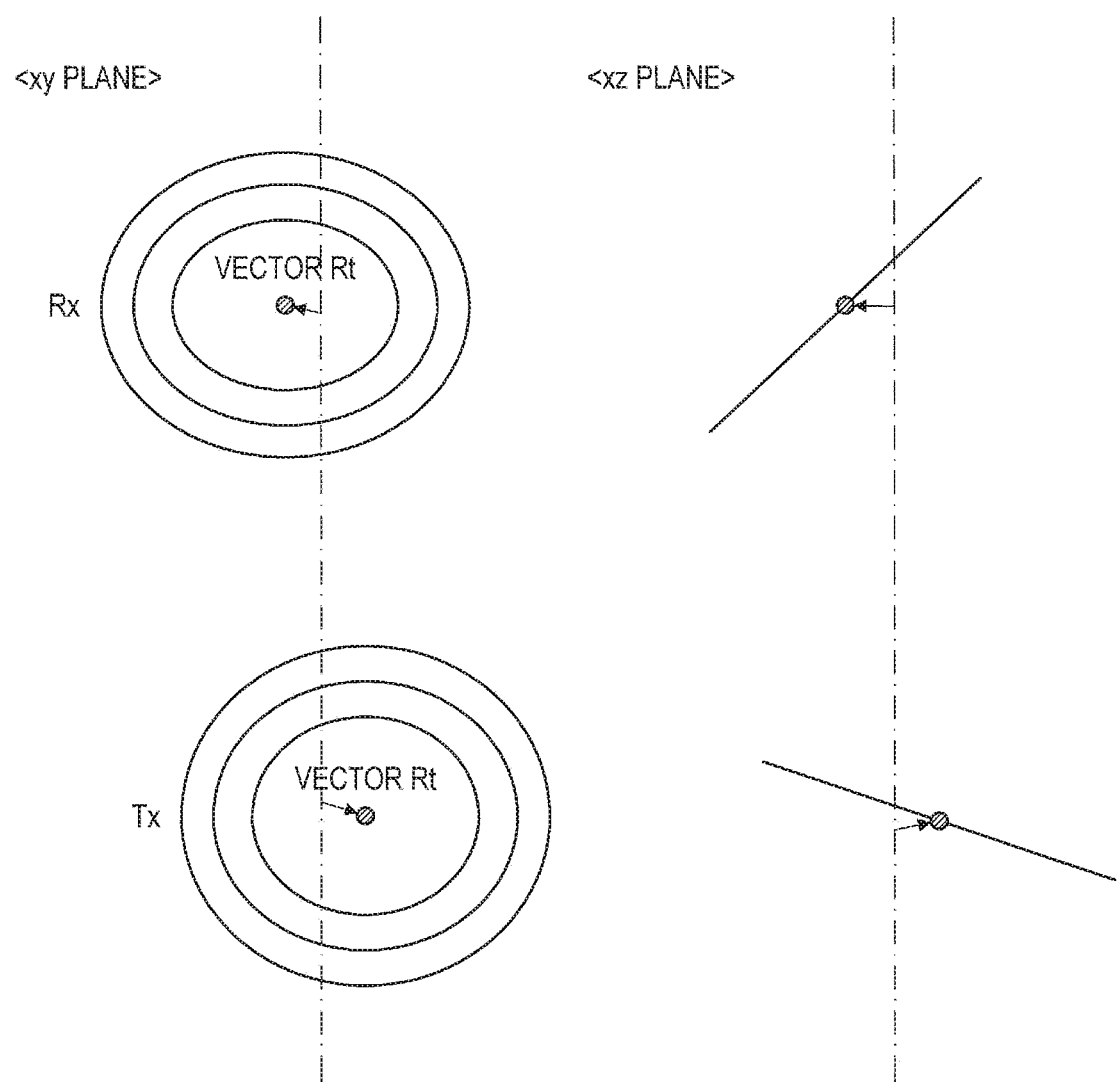
FIG. 16 is an explanatory diagram showing an example in which the amount of supplied electric power is changed with rotation positions.

FIG. 16 is an explanatory diagram showing an example in which the amount of supplied electric power is changed with the rotation position. The origin of each of the receiving coil 252 and the transmitting coil 253 is shifted from the center shaft 251 by a prescribed amount. The receiving coil 252 is shifted from the center shaft 251 by vector Rr, and the transmitting coil 253 is shifted from the center shaft 251 by vector Rt. The relationship between the power supply efficiency and the rotation angle becomes one to one by shifting the origin of each of the receiving coil 252 and the transmitting coil 253 from the center shaft 251 by a prescribed amount in this way. Thus, the rotation angle is determined uniquely by the amount of supplied electric power.

Figure 17:
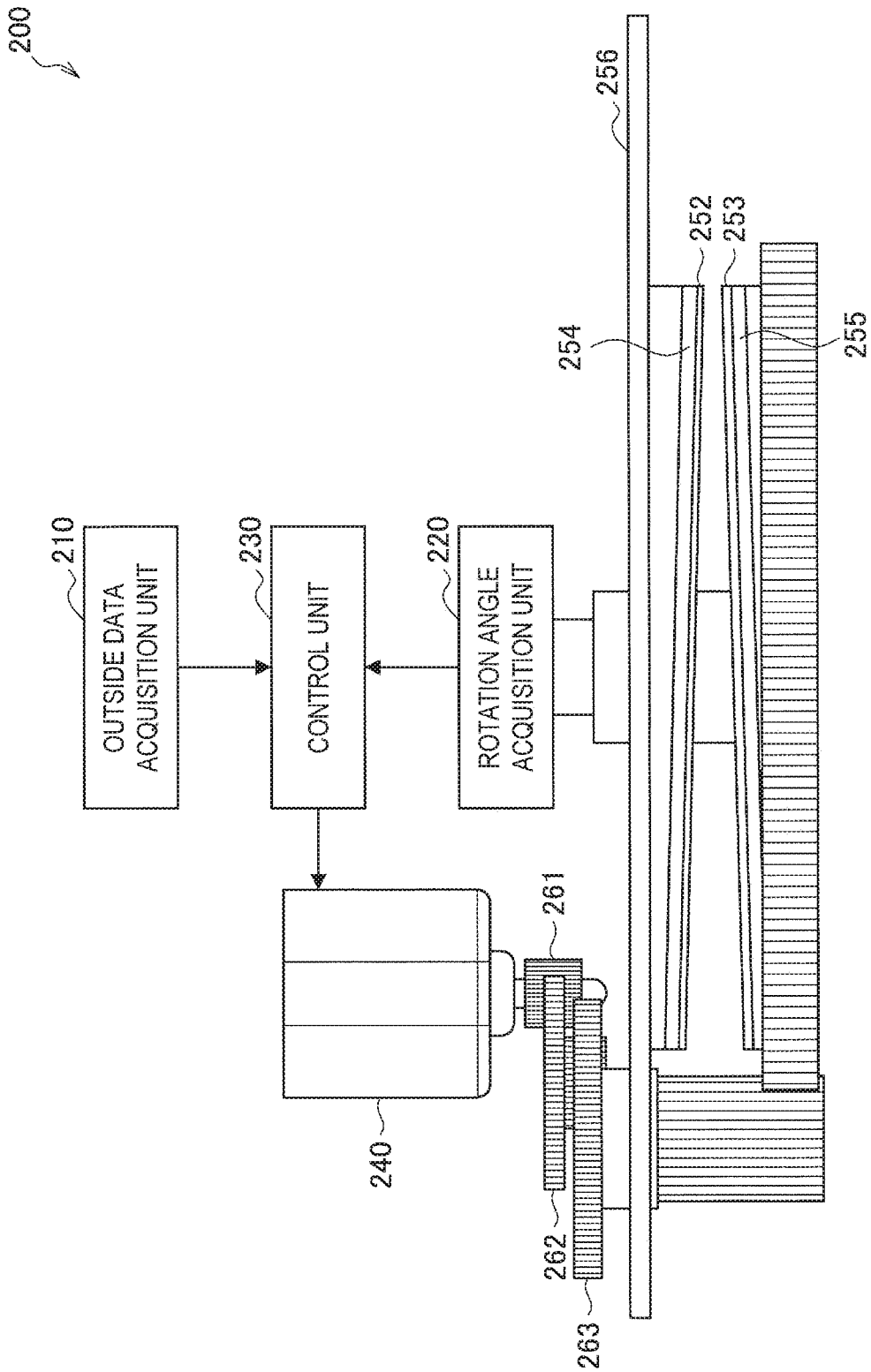
FIG. 17 is an explanatory diagram showing a detailed configuration example of a cradle.

FIG. 17 is an explanatory diagram showing a detailed configuration example of the cradle 200, and is particularly an explanatory diagram in which a configuration example of the rotational drive unit 250 is shown in detail from a lateral side. FIG. 17 shows a situation where the gap between the receiving coil 252 and the transmitting coil 253 is not fixed but varied with the place. By shifting the origin of each of this receiving coil 252 and this transmitting coil 253 from the center shaft 251 by a prescribed amount as shown in FIG. 16, the rotation angle can be acquired by the amount of supplied electric power.

Figure 18:
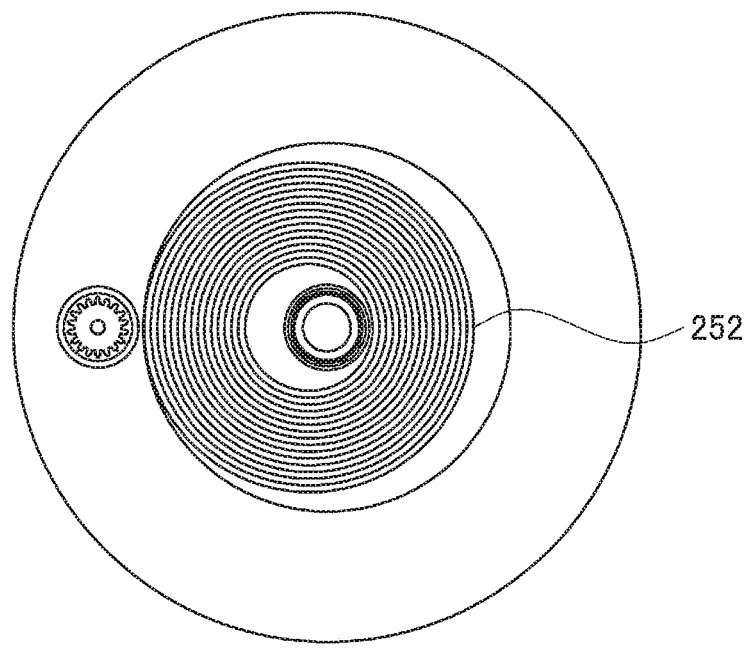
FIG. 18 is an explanatory diagram in which an example of a receiving coil is shown from a back side.
Figure 19:
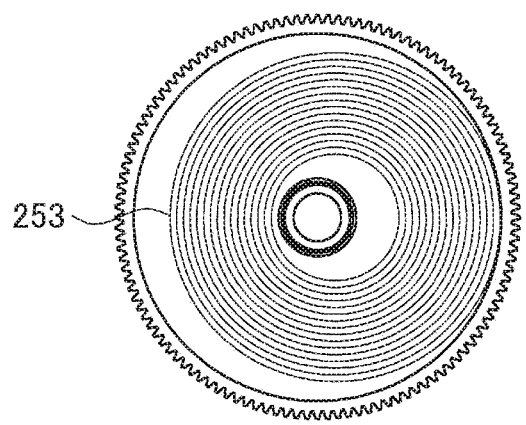
FIG. 19 is an explanatory diagram in which an example of a transmitting coil is shown from a back side.

FIG. 18 is an explanatory diagram in which an example of the receiving coil 252 is shown from the back side. FIG. 19 is an explanatory diagram in which an example of the transmitting coil 253 is shown from the back side. In addition, FIG. 20 is an explanatory diagram in which a state where the receiving coil 252 shown in FIG. 18 and the transmitting coil 253 shown in FIG. 19 overlap is shown by a plan view.

Figure 20:
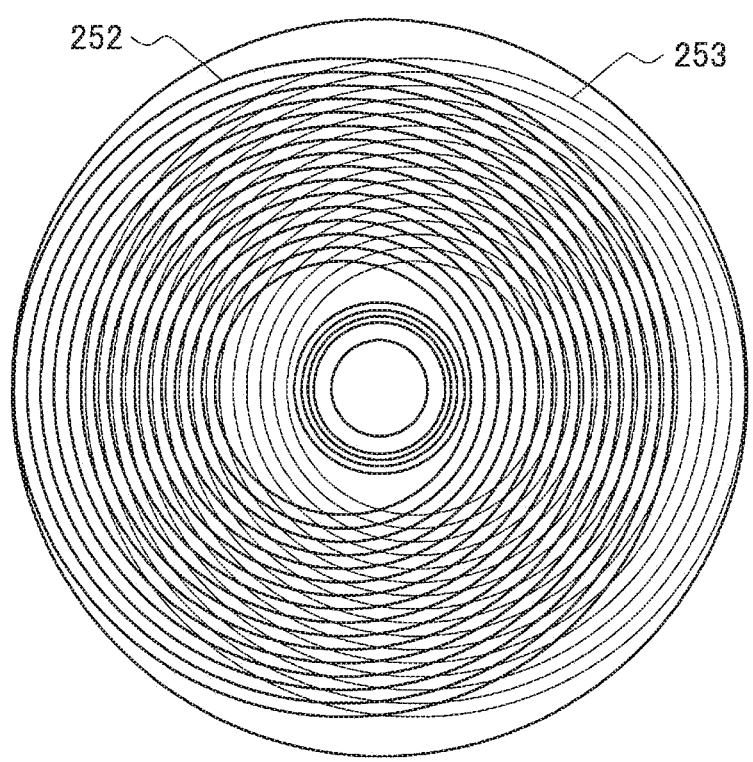
FIG. 20 is an explanatory diagram in which a state where the receiving coil shown in FIG. 18 and the transmitting coil shown in FIG. 19 overlap is shown by a plan view.

As shown in FIG. 20, the receiving coil 252 and the transmitting coil 253 overlap with each other in a state of being shifted from the origin by prescribed amounts. Therefore, if the receiving coil 252 rotates by the operation of the motor 240, the region where the receiving coil 252 and the transmitting coil 253 overlap changes in accordance with the rotation. Thus, the rotation angle acquisition unit 220 can find the rotation angle of the rotational drive unit 250 by monitoring the amount of supplied electric power (power supply efficiency) changing with the rotation of the receiving coil 252.

Figure 21:
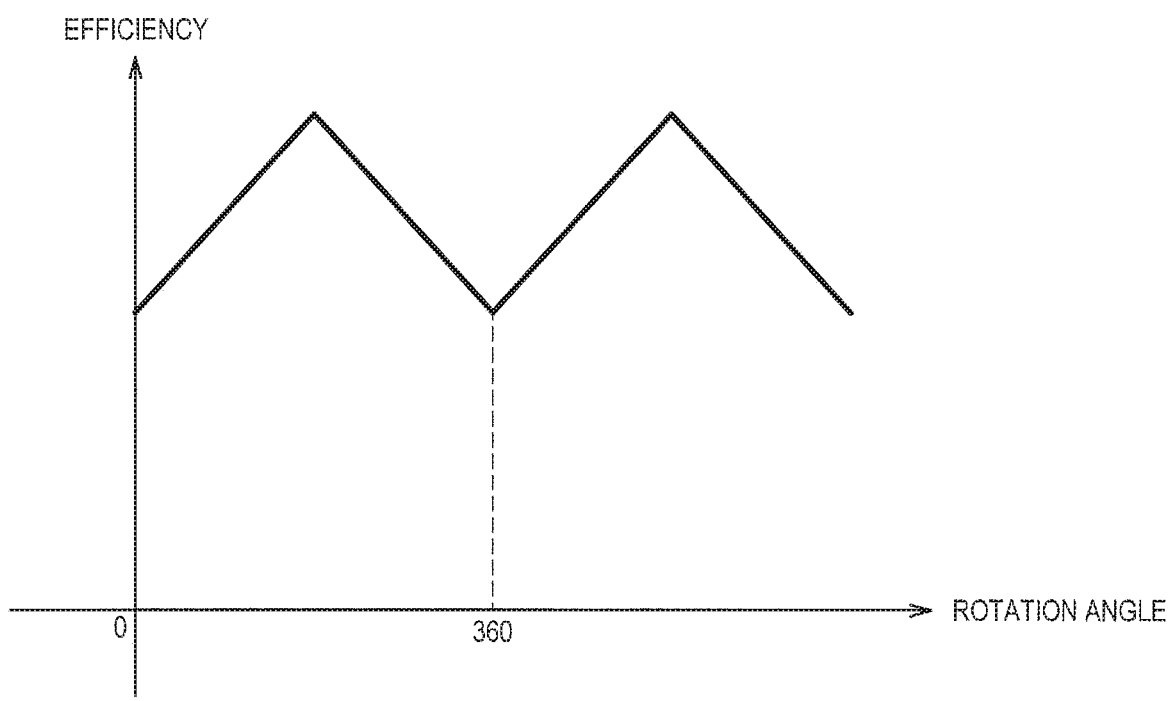
FIG. 21 is an explanatory diagram showing an example of a relationship between a rotation angle of a rotational drive unit and power supply efficiency based on a receiving coil and a transmitting coil.

FIG. 21 is an explanatory diagram showing an example of the relationship between the rotation angle of the rotational drive unit 250 and the power supply efficiency based on the receiving coil 252 and the transmitting coil 253. As shown in FIG. 21, if the rotation angle of the rotational drive unit 250 increases from 0 degrees, also the power supply efficiency increases in accordance with the increase of the rotation angle; if the rotation angle exceeds 180 degrees, the power supply efficiency decreases. Then, if the rotation angle of the rotational drive unit 250 reaches 360 degrees, the power supply efficiency turns to increase again. The rotation angle acquisition unit 220 can find the rotation angle of the rotational drive unit 250 by monitoring the efficiency changing with the rotation of the receiving coil 252.

Another example in which the amount of supplied electric power is changed with the rotation position will now be described. The amount of electric power supplied by the receiving coil 252 and the transmitting coil 253 may be changed in accordance with the rotation of the rotational drive unit 250 by, for at least either one of the receiving coil 252 or the transmitting coil 253, making the shape asymmetrical or changing the number of turns.

Figure 22:
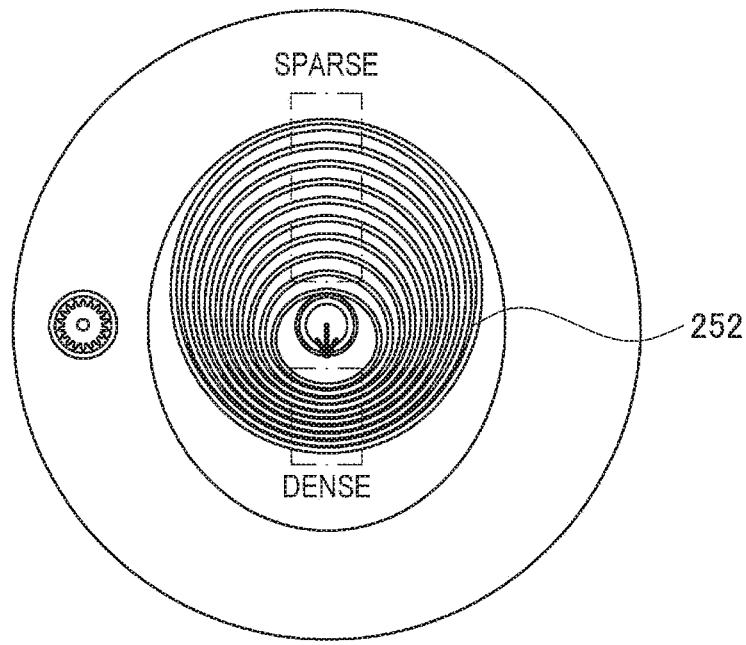
FIG. 22 is an explanatory diagram in which an example of a receiving coil is shown from a back side.
Figure 23:
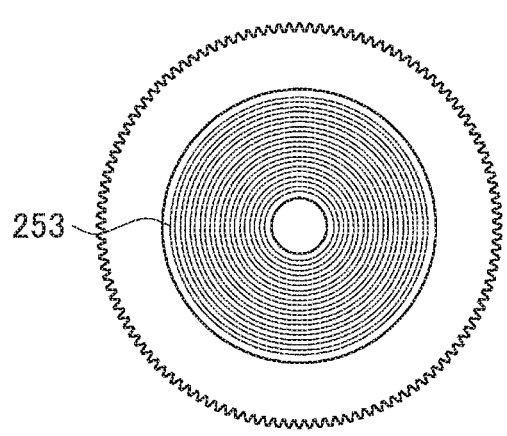
FIG. 23 is an explanatory diagram in which an example of a transmitting coil is shown from a back side.
Figure 24:
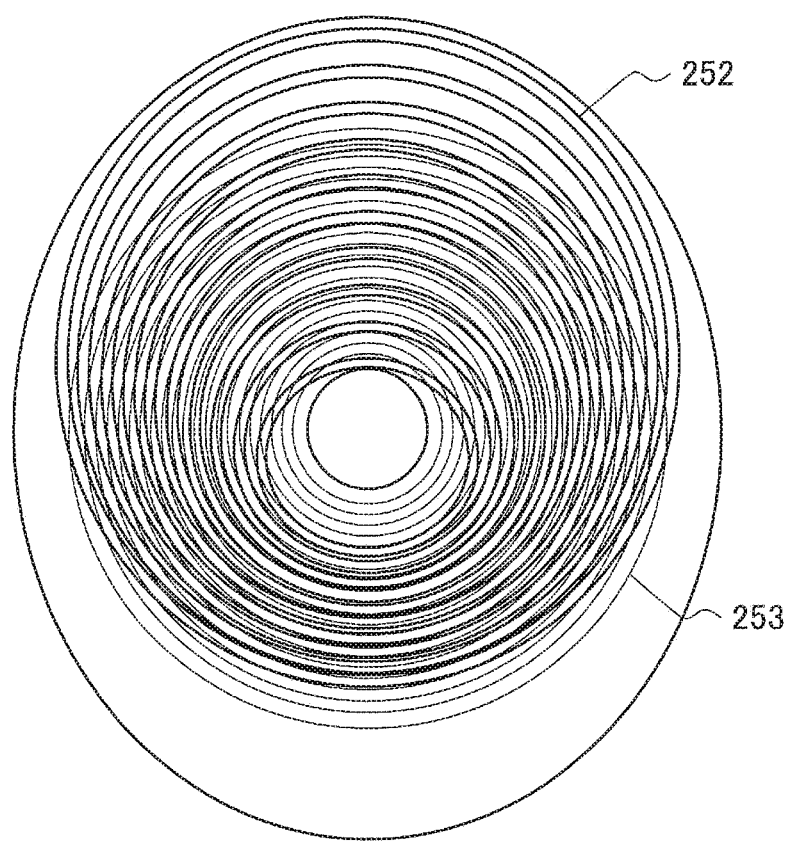
FIG. 24 is an explanatory diagram in which a state where the receiving coil shown in FIG. 22 and the transmitting coil shown in FIG. 23 overlap is shown by a plan view.

FIG. 22 is an explanatory diagram in which an example of the receiving coil 252 is shown from the back side. FIG. 23 is an explanatory diagram in which an example of the transmitting coil 253 is shown from the back side. In addition, FIG. 24 is an explanatory diagram in Which a state where the receiving coil 252 shown in FIG. 22 and the transmitting coil 253 shown in FIG. 23 overlap is shown by a plan view.

The receiving coil 252 is formed in an asymmetrical shape as shown in FIG. 22 and the transmitting coil 253 is formed in a line-symmetrical and point-symmetrical shape as shown in FIG. 23; thereby, the amount of electric power supplied by the receiving coil 252 and the transmitting coil 253 can be changed in accordance with the rotation of the rotational drive unit 250.

Further, the cradle 200 according to an embodiment of the present disclosure may give asymmetry to the magnetic shielding force by partially altering the shape or the thickness of the magnetic shielding sheet. The amount of supplied electric power (power supply efficiency) changes with the rotation of the receiving coil 252 by giving asymmetry to the magnetic shielding force of the magnetic shielding sheet.

Thus, the rotation angle acquisition unit 220 can find the rotation angle of the rotational drive unit 250 by monitoring the amount of supplied electric power (power supply efficiency) changing with the rotation of the receiving coil 252. Since the rotation angle of the rotational drive unit 250 can be found by simply altering the shape or the thickness of the magnetic shielding sheet in a partial manner, the cradle 200 according to an embodiment of the present disclosure can find the rotation angle of the rotational drive unit 250 at low cost.

Figure 25:
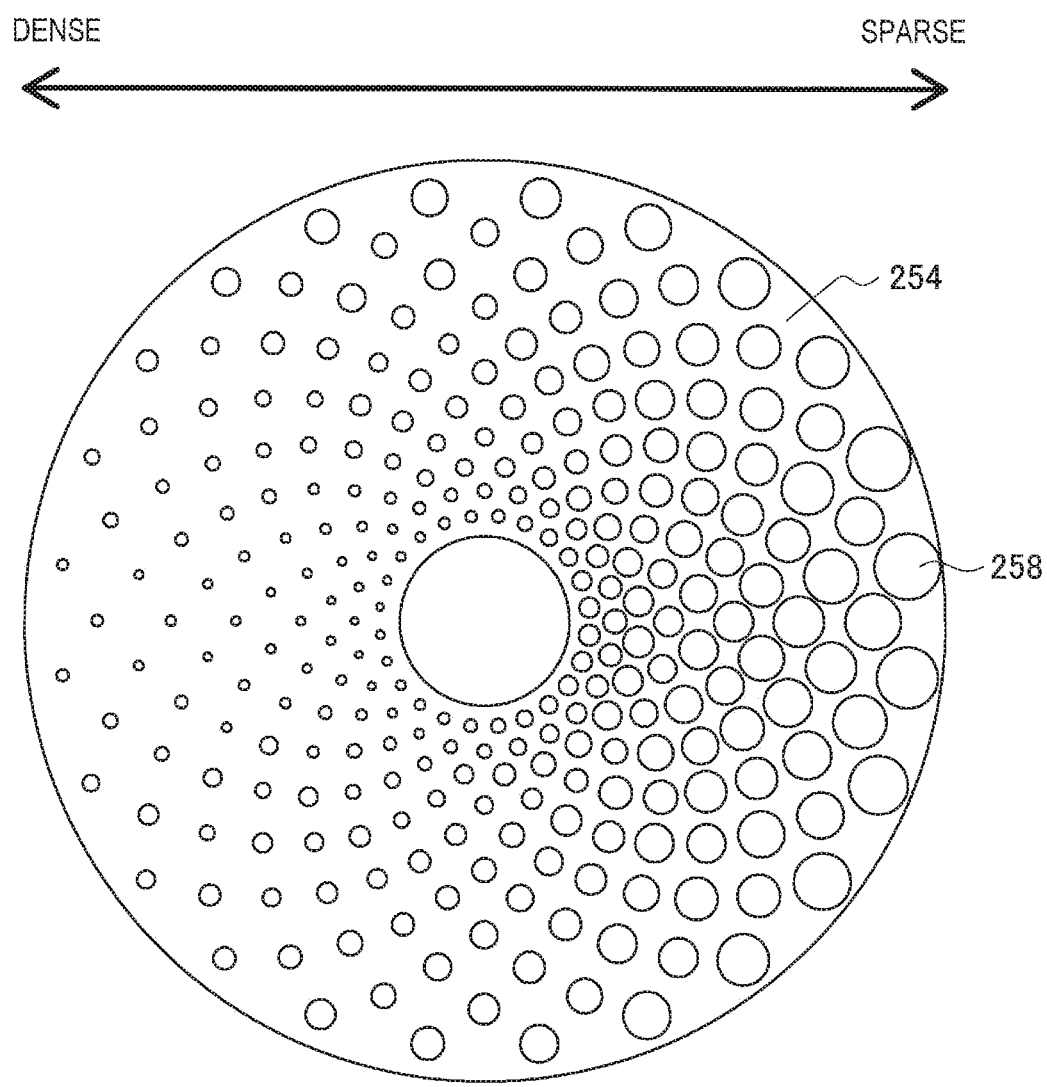
FIG. 25 is an explanatory diagram showing an example of a shape of a magnetic shielding sheet according to an embodiment of the present disclosure.

FIG. 25 is an explanatory diagram showing an example of the shape of the magnetic shielding sheet 254 or 255 according to an embodiment of the present disclosure. By forming a plurality of holes 258 in the magnetic shielding sheet 254 and further changing the shape of the hole 258 with the place in this way, asymmetry can be given to the magnetic shielding force of the magnetic shielding sheet 254. Then, by providing such a magnetic shielding sheet 254, the cradle 200 according to an embodiment of the present disclosure can change the amount of supplied electric power (power supply efficiency) by the rotation of the receiving coil 252.

<2. Conclusions>

As described hereinabove, an embodiment of the present disclosure provides a cradle 200 in which the rotation of the rotational drive unit 250 and the rotation angle of the rotational drive unit 250 are acquired in a one-to-one manner and the operational control of the motor 240 by the control unit 230 can be performed easily.

It should be understood by those skilled in the art that various modifications, combinations, sub-combinations and alterations may occur depending on design requirements and other factors insofar as they are within the scope of the appended claims or the equivalents thereof.

For example, although the cradle 200 is described in the above embodiments, the present disclosure is not limited to related examples. That is, driving control like that described above can be performed on all objects that make rotational motion by the driving of a motor.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A driving apparatus including:
 a rotation unit configured to be rotated about a center shaft by driving of a motor;
 a rotation angle acquisition unit configured to acquire information of a rotation angle of the rotation unit, as information proportional to the rotation angle; and
 a control unit configured to control the driving of the motor on the basis of the information of the rotation angle acquired by the rotation angle acquisition unit.

(2)
The driving apparatus according to (1),
 in which the rotation angle acquisition unit is provided on the center shaft.

(3)
The driving apparatus according to (2),
 in which the rotation angle acquisition unit is a sensor provided on the center shaft.

(4)
The driving apparatus according to (2) or (3),
 in which the control unit performs control that causes the motor to be driven so as to be stopped while avoiding a vicinity of a region in which the information of the rotation angle acquired by the rotation angle acquisition unit changes sharply.

(5)
The driving apparatus according to (4),
 in which the vicinity of the region in which the information of the rotation angle changes sharply is a vicinity of a period in which the rotation unit makes one rotation.

(6)
The driving apparatus according to (1),
 in which the rotation unit further includes
  a non-contact power supply unit configured to perform non-contact power supply and rotate by the driving of the motor, and
 the rotation angle acquisition unit acquires the information of the rotation angle of the rotation unit on the basis of power supply efficiency of the non-contact power supply unit in accordance with rotation.

(7)
The driving apparatus according to (6),
 in which the non-contact power supply unit includes
  a transmitting coil configured to generate a magnetic field, and
  a receiving coil configured to generate a current by electromagnetic induction based on the magnetic field generated by the transmitting coil, and
 the rotation angle acquisition unit acquires the information of the rotation angle of the rotation unit on the basis of change in power supply efficiency in accordance with rotation, which change is caused by difference in shape between the transmitting coil and the receiving coil.

(8)
The driving apparatus according to (6),
 in which the non-contact power supply unit includes
  a transmitting coil configured to generate a magnetic field, and
  a receiving coil configured to generate a current by electromagnetic induction based on the magnetic field generated by the transmitting coil, and
 the rotation angle acquisition unit acquires the information of the rotation angle of the rotation unit on the basis of change in power supply efficiency in accordance with rotation, which change is caused by difference of a spacing between the transmitting coil and the receiving coil.

(9)
The driving apparatus according to (6),
 in which the non-contact power supply unit includes
  a magnetic shielding sheet configured to prevent release of a magnetic field generated by a coil to an outside, and
 the rotation angle acquisition unit acquires the information of the rotation angle of the rotation unit on the basis of change in power supply efficiency in accordance with rotation, which change is caused by a shape of the magnetic shielding sheet.

(10)
The driving apparatus according to (9),
 in which a plurality of holes sizes of which vary with positions is formed in the magnetic shielding sheet.

(11)
A driving control method including:
 acquiring information of a rotation angle of a rotation unit configured to be rotated about a center shaft by driving of a motor, as information proportional to the rotation angle and
 controlling the driving of the motor on the basis of the acquired information of the rotation angle.

What is claimed is:
1. A driving apparatus comprising:
a rotation unit configured to be rotated about a center shaft by driving of a motor;
rotation angle acquisition circuitry configured to acquire information of a rotation angle of the rotation unit, as information proportional to the rotation angle; and
control circuitry configured to control the driving of the motor on a basis of the information of the rotation angle acquired by the rotation angle acquisition circuitry, wherein
the rotation angle acquisition circuitry is provided on the center shaft, and
the control circuitry is configured to perform control that causes the motor to be driven so as to be stopped while avoiding a vicinity of a region in which the information of the rotation angle acquired by the rotation angle acquisition circuitry changes sharply.

2. The driving apparatus according to claim 1,
wherein the rotation angle acquisition circuitry is a sensor provided on the center shaft.

3. The driving apparatus according to claim 1,
wherein the vicinity of the region in which the information of the rotation angle changes sharply is a vicinity of a period in which the rotation unit makes one rotation.

4. A driving apparatus comprising:
a rotation unit configured to be rotated about a center shaft by driving of a motor;
rotation angle acquisition circuitry configured to acquire information of a rotation angle of the rotation unit, as information proportional to the rotation angle; and
control circuitry configured to control the driving of the motor on a basis of the information of the rotation angle acquired by the rotation angle acquisition circuitry, wherein
the rotation unit further includes
a non-contact power supply unit configured to perform non-contact power supply and rotate by the driving of the motor, and
the rotation angle acquisition circuitry acquires the information of the rotation angle of the rotation unit on a basis of power supply efficiency of the non-contact power supply unit in accordance with rotation.

5. The driving apparatus according to claim 4,
wherein the non-contact power supply unit includes
a transmitting coil configured to generate a magnetic field, and
a receiving coil configured to generate a current by electromagnetic induction based on the magnetic field generated by the transmitting coil, and
the rotation angle acquisition circuitry acquires the information of the rotation angle of the rotation unit on a basis of change in power supply efficiency in accordance with rotation, which change is caused by difference in shape between the transmitting coil and the receiving coil.

6. The driving apparatus according to claim 4,
wherein the non-contact power supply unit includes
a transmitting coil configured to generate a magnetic field, and
a receiving coil configured to generate a current by electromagnetic induction based on the magnetic field generated by the transmitting coil, and
the rotation angle acquisition circuitry acquires the information of the rotation angle of the rotation unit on a basis of change in power supply efficiency in accordance with rotation, which change is caused by difference of a spacing between the transmitting coil and the receiving coil.

7. The driving apparatus according to claim 4,
wherein the non-contact power supply unit includes
a magnetic shielding sheet configured to prevent release of a magnetic field generated by a coil to an outside, and
the rotation angle acquisition circuitry acquires the information of the rotation angle of the rotation unit on a basis of change in power supply efficiency in accordance with rotation, which change is caused by a shape of the magnetic shielding sheet.

8. The driving apparatus according to claim 7,
wherein a plurality of holes sizes of which vary with positions is formed in the magnetic shielding sheet.

9. A driving control method comprising:
acquiring, using rotation angle acquisition circuitry, information of a rotation angle of a rotation unit configured to be rotated about a center shaft by driving of a motor, as information proportional to the rotation angle; and
controlling, using control circuitry, the driving of the motor on a basis of the information of the rotation angle acquired by the rotation angle acquisition circuitry, wherein
the rotation angle acquisition circuitry is provided on the center shaft, and
the method further comprises performing, using the control circuitry, control that causes the motor to be driven so as to be stopped while avoiding a vicinity of a region in which the information of the rotation angle acquired by the rotation angle acquisition circuitry changes sharply.

\* \* \* \* \*